United States Patent [19]

Giger, Jr.

[11] 3,991,441

[45] Nov. 16, 1976

[54] MECHANIZED SHACKLING/HOISTING

[75] Inventor: Walter Giger, Jr., Wethersfield, Conn.

[73] Assignee: Council of Livestock Protection, Inc., New York, N.Y.

[22] Filed: Oct. 1, 1975

[21] Appl. No.: 618,467

[52] U.S. Cl. .................................. 17/24; 17/44
[51] Int. Cl.² ............................... A22C 15/00
[58] Field of Search ............ 17/44, 44.2, 44.3, 44.1, 17/24, 14, 17; 119/153, 151, 128; 43/86, 87; 211/89; 248/317, 339

[56] References Cited
UNITED STATES PATENTS

| | | | |
|---|---|---|---|
| 1,229,977 | 6/1917 | Klenk et al. | 17/44.3 |
| 2,882,833 | 4/1959 | Reich | 17/24 |
| 3,206,798 | 9/1965 | Aubert | 17/24 |
| 3,530,834 | 9/1970 | Hollenback et al. | 17/44 |

Primary Examiner—Louis G. Mancene
Assistant Examiner—James D. Hamilton
Attorney, Agent, or Firm—Moonray Kojima

[57] ABSTRACT

A mechanized shackling arrangement comprising a pivoting elongated arm carried on an overhead rail, a pivoting snare attached to the lower end of the arm with a resilient device holding the snare normally parallel with the arm and a locating plate attached to the arm and disposed at a distance therefrom parallel to the arm and in back of the snare. The arm is moved at an angle to catch the hind leg of the slain animal with the hoof touching the locating plate. The arm is moved at the angle until the hock is caught by the snare, and the hind leg and carcass are lifted from the holder and hoisted up and moved.

2 Claims, 2 Drawing Figures

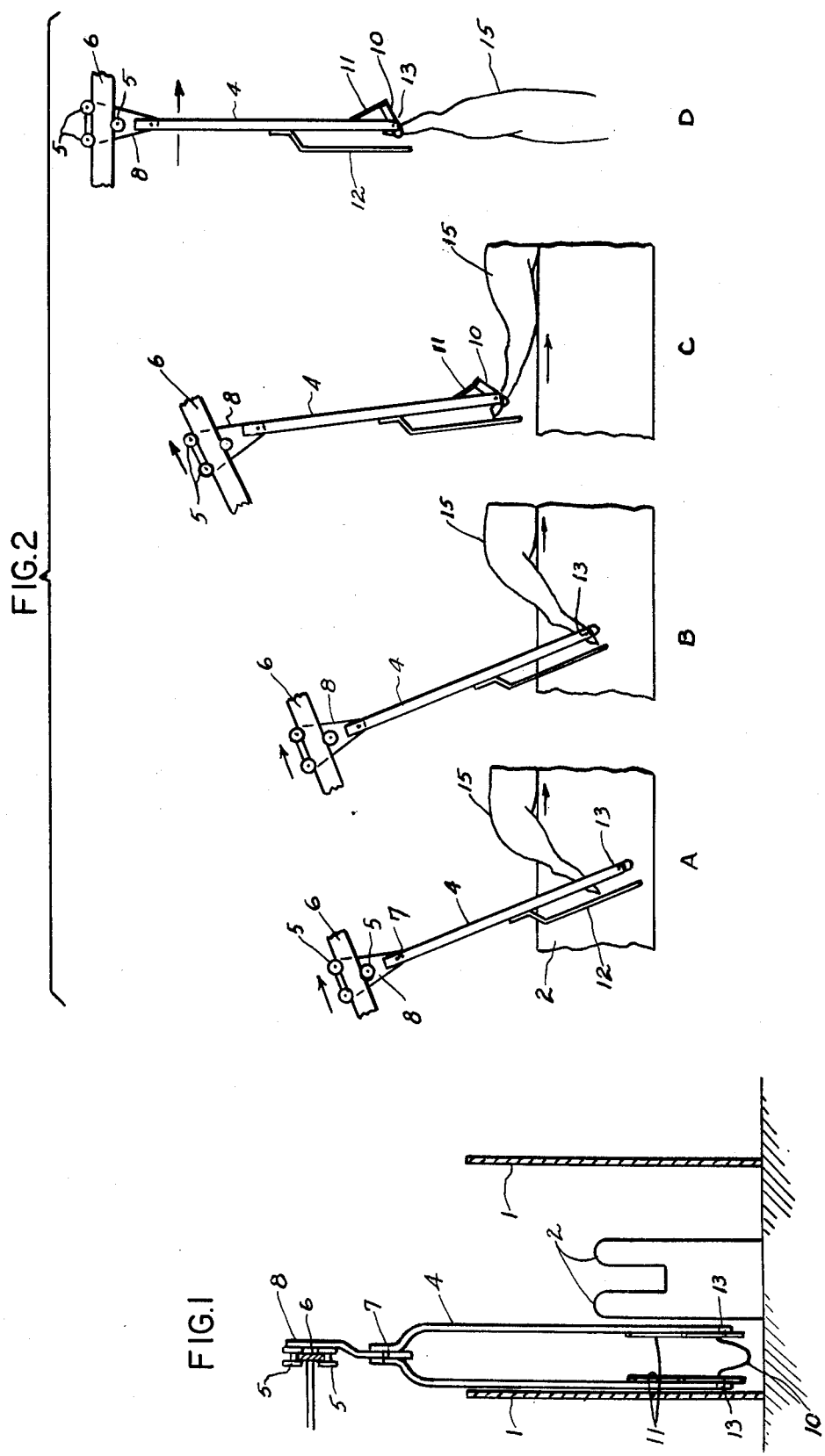

MECHANIZED SHACKLING/HOISTING

This invention relates to a mechanical shackling and hoisting arrangement for slaughtering animals.

In copending application Giger, Westervelt Ser. No. 618,463 filed concurrently herewith on Oct. 1, 1975 and assigned to the same assignee hereof, there is disclosed a double rail conveyor system for slaughtering animals. The animal is positioned upright on a pair of rails with its legs straddling the rails and is slaughtered in that position. The hind legs of the slain animal are thus located on the sides of the rails. This present invention may be used, but is not limited to such use, to shackle either hind legs and to hoist and to remove the slain animal from the rails.

Briefly, this invention encompasses a shackling and hoisting arrangement for slaughtered animals, comprising an arm pivotally connected to an overhead rail and movable on the overhead rail. On the lower end of the arm is pivotally connected a snare with resilient rubber or spring means to hold the snare in the plane of the arm while not in use, and a locating plate connected to the arm and located at an appropriate distance away from the arm in back of the snare. The distance between the plate and the snare is sufficient to enable the snare to catch the hock when the hoof hits the plate. The arm is moved forward at an angle until the hind leg and hoof go through the arm and the hoof hits the plate. The arm continues to move until the snare catches the hock and then moves the leg upward until the carcass if finally hoisted above the holder.

A feature of the invention is the movable pivoted arm having a snare and locating plate which is moved to catch the hock of the hind leg and lift same above the conveyor.

Another feature of the invention is the resilient means holding the snare pivotally about the lower end of the arm so that when at a perpendicular position to the floor, the snare is able to continue holding the leg.

The invention will be illustrated with reference to the drawing, in which:

FIG. 1 depicts an end view of the shackling arrangement of the invention; and

FIGS. 2A, 2B, 2C, 2D, depict a sequence of operation showing the mechanical shackling and hoisting of a slain animal by its hind leg.

Turning now to FIGS. 1, 2A, 2B, 2C, 2D, there are depicted arm 4 pivotally mounted at the upper end by attaching means 7 to plate 8 having rolls 5 attached thereto. The rolls 5 are movably attached to the overhead rails 6. The plate 8 and arm 4 may be moved by motor power, not shown, applied for example to shaft 6. Toward the lower end of arm 4, is pivotally attached at pivot 13, a snare 10 having an extension on the other side of pivot 13 attached to rubber strips or other resilient spring means 11. Also, as seen in FIG. 2A, attached to arm 4 is locating plate 12 suitably spaced from arm 4 in back of snare 10 as depicted.

The shackling arrangement may advantageously be used with the double rail conveyor system such as disclosed in the above mentioned Giger, Westervelt application. Such a system may comprise a pair of rails having conveyor belts thereon and located between two vertical walls 1. The shackling arm 4 may be located between any of the walls 1 and the double rails 2 to catch either hind leg.

FIGS. 2A, 2B, 2C and 2D show the sequence of operation. A slain animal is shown being moved to the right by a conveyor belt on top of double rails 2. The animal is positioned upright with its legs straddling the double rails. The arm 4 swings forward to the right at an angle as shown and straddles the leg of the animal until stopped by plate 12, as shown in FIG. 2A. Then, as shown in FIG. 2B, the arm 4 moves up vertically causing snare 10 to catch hold of the hock of the animal 15. Next, in FIG. 2C, the arm 4 continues moving upward, and snare 10, which is pivotally mounted by attaching means 13 (shown more clearly in FIG. 2D) adjusts to the leg angle. Then, finally, in FIG. 2D, the arm 4 continues upward and the animal 15 is fully supported by the snare 10 and the animal is hoisted up and then moved forward. During the operation, of course, the rails are located overhead in such positions to cause the discussed operation with suitable motor power used.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. A shackling and hoisting arrangement, comprising an elongated arm having a top portion and a bottom portion; said bottom portion ending with two parallel bars and an opening therebetween;
overhead rail means;
means for movably attaching said top portion of said arm to said overhead rail means;
a snare having a circularly shaped end pivotally connected to said end bars of said arm;
resilient means for holding said snare parallel with and within said end bars; and
locating plate attached to said bottom portion of said arm and extending in back of said snare at a sufficient distance to cause the hock of said animal's hind leg to be caught by said snare when the animal's hind leg hoof hits the locating plate.

2. The arrangement of claim 1, wherein said overhead rail means are constructed to be at a distance and at angles sufficient to enable said end bars of said bottom part of said arm to straddle said leg of said animal while snaring said hock.

* * * * *